(12) United States Patent
Balzer et al.

(10) Patent No.: US 6,217,683 B1
(45) Date of Patent: Apr. 17, 2001

(54) MONITORED VEHICLE TIRE AND MONITOR RETAINER ASSEMBLY

(75) Inventors: Raymond J. Balzer, Easley; Preston Butler Kemp, Jr., Greenville; Cecil Young, Lyman, all of SC (US); David Kevin Stafford, Perignat les Sarlieves (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 09/449,268

(22) Filed: Nov. 24, 1999

Related U.S. Application Data

(63) Continuation-in-part of application No. 09/249,232, filed on Feb. 11, 1999.
(60) Provisional application No. 60/074,477, filed on Feb. 12, 1998.

(51) Int. Cl.$^7$ ................................................. B60C 19/08
(52) U.S. Cl. ........................ 156/60; 156/153; 152/152.1
(58) Field of Search ............................... 156/60, 153, 66, 156/91, 92; 152/152.1; 24/453; 411/510

(56) References Cited

U.S. PATENT DOCUMENTS

| | | | |
|---|---|---|---|
| 3,787,806 | 1/1974 | Church | 340/58 |
| 3,873,965 | 3/1975 | Garcia | 340/58 |
| 4,067,235 | 1/1978 | Markland et al. | 73/146.5 |
| 4,246,567 | 1/1981 | Miller | 340/58 |
| 4,334,215 | 6/1982 | Frazier et al. | 340/539 |
| 4,862,486 | 8/1989 | Wing et al. | 377/16 |
| 4,911,217 | 3/1990 | Dunn et al. | 152/152.1 |
| 4,938,645 | 7/1990 | Wollar | 411/508 |
| 5,181,975 | 1/1993 | Pollack et al. | 152/152.1 |
| 5,218,861 | 6/1993 | Brown et al. | 73/146.5 |
| 5,468,108 | 11/1995 | Sullivan et al. | 411/510 |
| 5,500,065 | 3/1996 | Koch et al. | 156/123 |
| 5,562,787 | 10/1996 | Koch et al. | 156/64 |
| 5,573,610 | 11/1996 | Koch et al. | 152/152.1 |
| 5,573,611 | 11/1996 | Koch et al. | 152/152.1 |
| 5,718,025 | 2/1998 | Courtin | 24/453 |
| 5,731,754 | 3/1998 | Lee, Jr. et al. | 340/447 |
| 5,971,046 | * 10/1999 | Koch et al. | 152/152.1 |
| 6,030,478 | * 2/2000 | Koch et al. | 156/123 |

FOREIGN PATENT DOCUMENTS

| | | | |
|---|---|---|---|
| 0639472 | 2/1995 | (EP) | B60C/13/00 |
| 2661373 | 10/1991 | (FR) | B60C/23/04 |

\* cited by examiner

*Primary Examiner*—Michael W. Ball
*Assistant Examiner*—John T Haran
(74) *Attorney, Agent, or Firm*—Alan Csontos; Martin Farrell; Robert Reed

(57) ABSTRACT

The present invention provides a tire monitor retainer assembly and monitored vehicle tire. A module which monitors tire information is supported by a rubber ply affixed to the inside surface of the tire. The module has electrical components for monitoring tire information by collecting, storing and/or reading information about the tire. A fastener assembly is used to secure the module to the rubber ply such that the module is support within the tire's cavity. The module is mounted to be isolated from tire loads such that the durability of the monitoring system is improved. The fastener assembly has first parts carried by the rubber ply and second fastener parts built into the module. The first and second fastener parts cooperate to support said module from said rubber ply. The module is made with a retainer opening having edges to receive a fastener device having standoff or indexing elements. The fastener device can also be in the form of a strap with free ends that wrap around the module having hook and loop first fastener parts for holding the module adjacent the rubber ply. In another embodiment, the fastener assembly can be semi-rigid straps with slotted fasteners to contact second fastener parts of the module. The tire monitor retainer assembly may allow the module to be removed for inspection, repairs or updating.

27 Claims, 11 Drawing Sheets

Fig. 5A
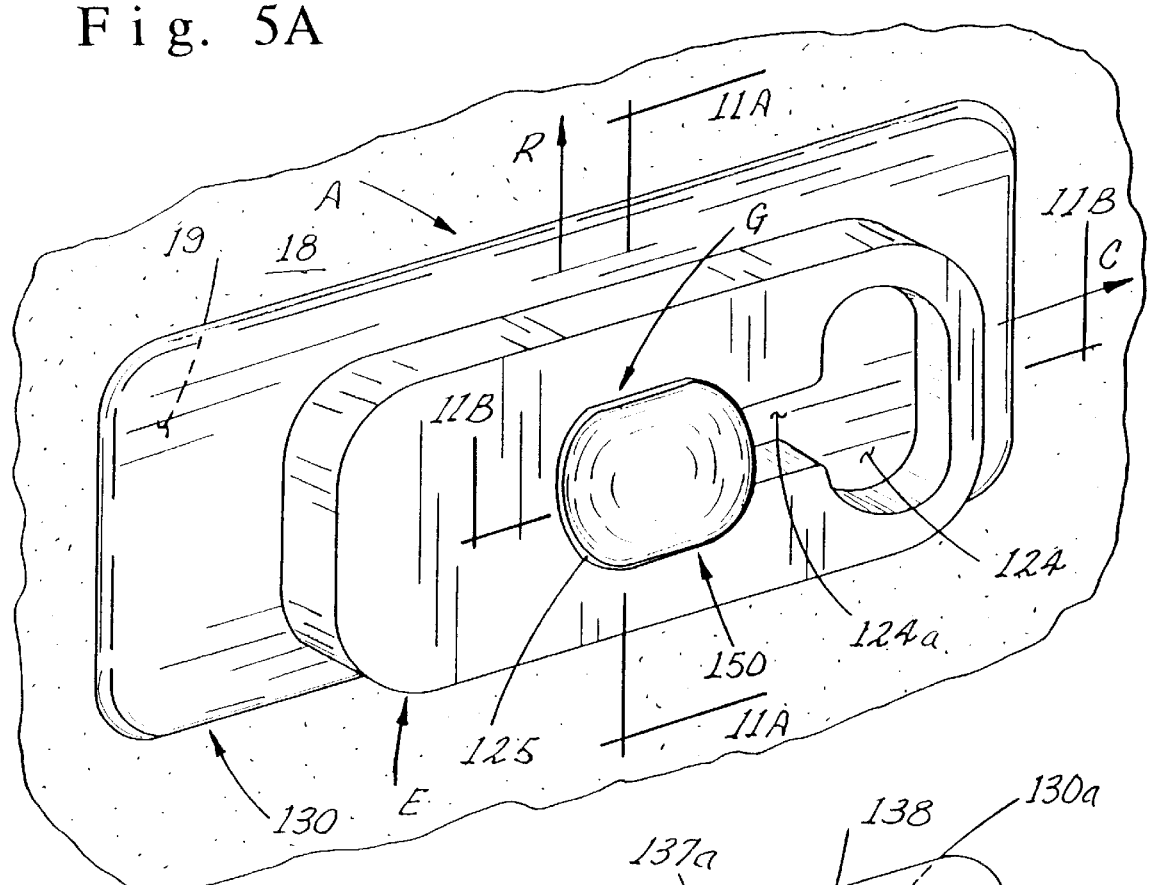
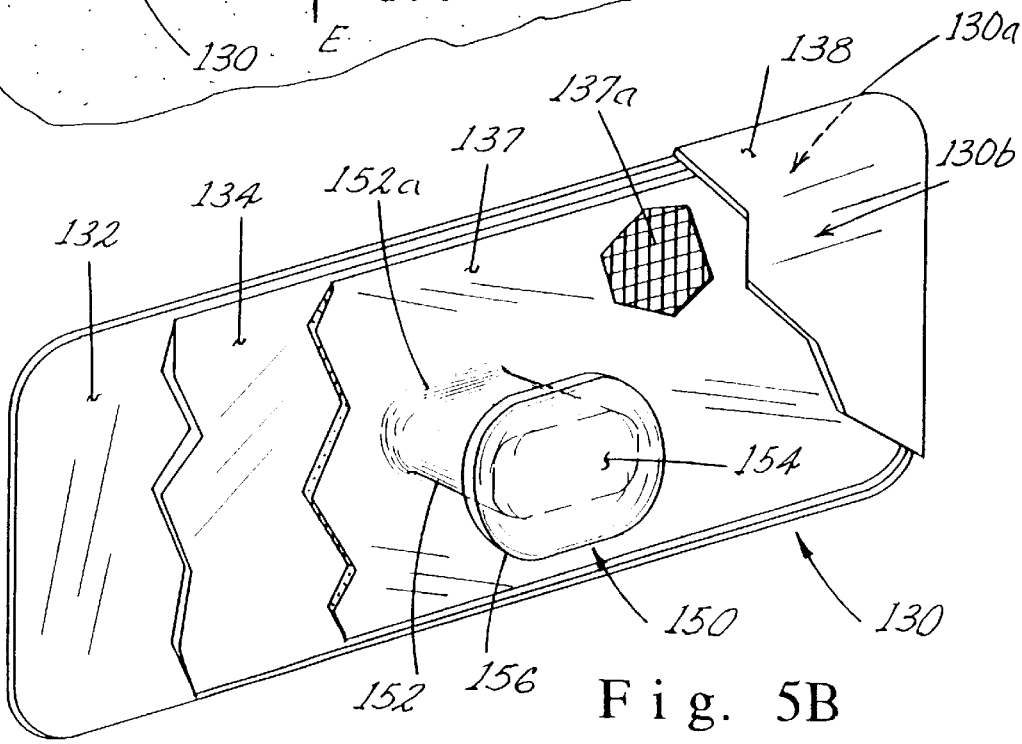
Fig. 5B

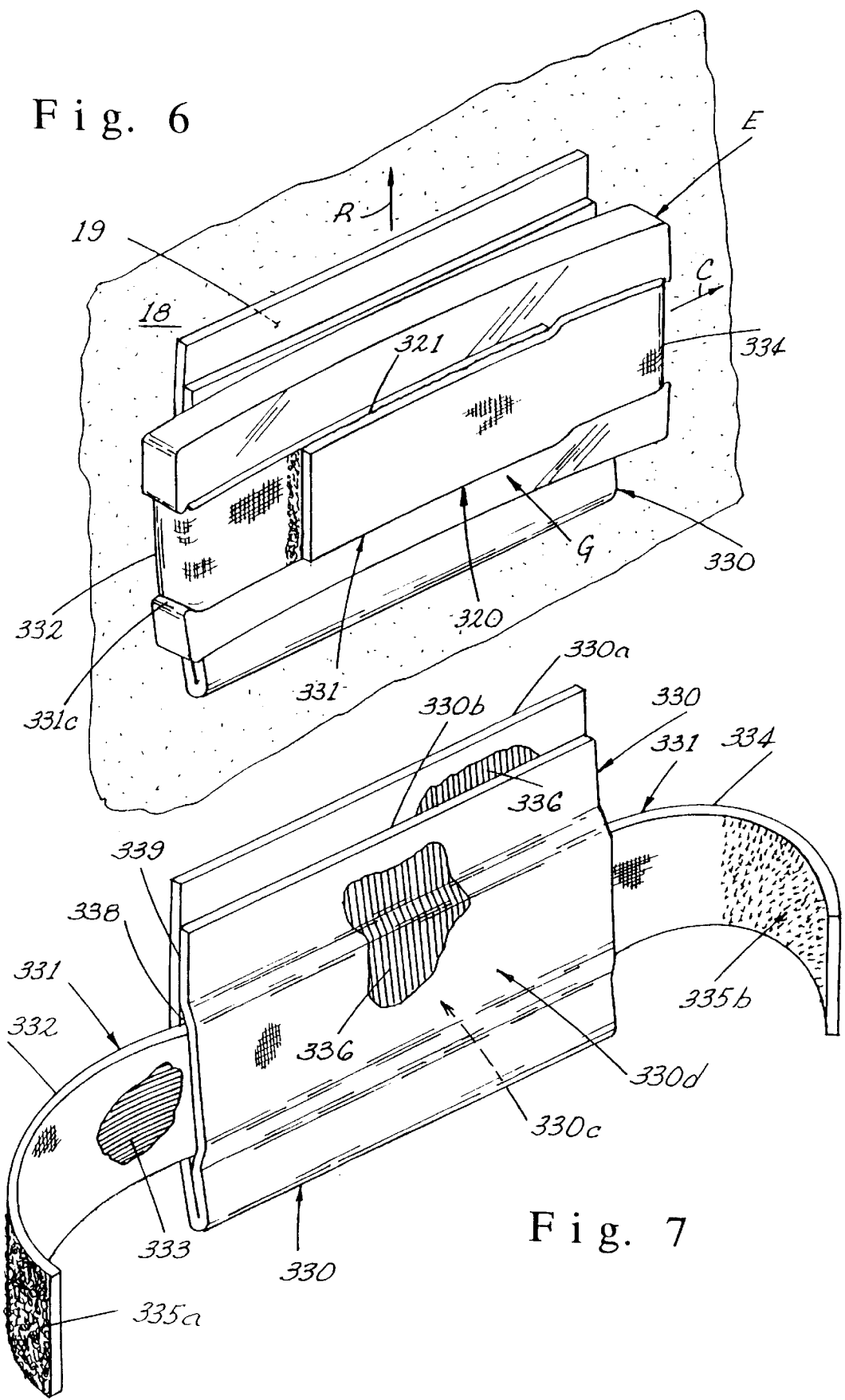

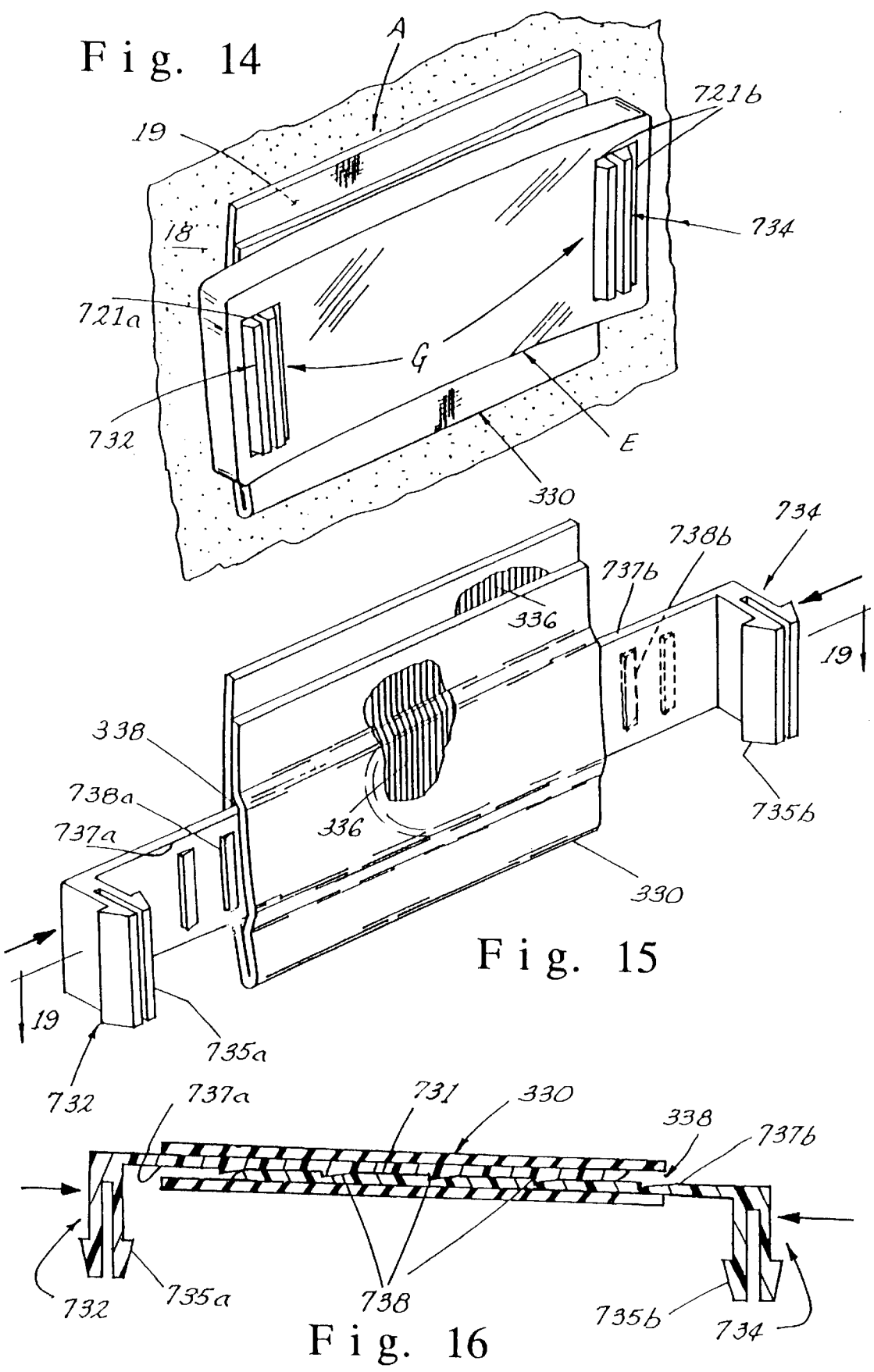

MONITORED VEHICLE TIRE AND MONITOR RETAINER ASSEMBLY

RELATED APPLICATIONS

This application is a continuation-in-part of application Ser. No. 09/249,232, filed Feb. 11, 1999 and claims the benefit of U.S. Provisional Application No. 60/074,477, filed Feb. 12, 1998.

BACKGROUND OF THE INVENTION

This invention relates to vehicle tires, including spare tires, and more particularly to tires specifically designed to include modules for electronically monitoring tire performance and for other tire information. The invention is particularly useful for attaching the module to be supported near the interior surface of the tire.

With the increased use of electronics for recording, identification and monitoring devices used in vehicle tires the problem of incorporating these electronic modules within or upon the tire continues. Electronic chips or other generally rigid or semi-rigid devices have been made to monitor and/or record a number of tire parameters, as well as to identify and locate tires. These include manufacturing and inventory data, sales and distribution information, physical performance data, environmental engineering data and the like. Modules can store data to be updated, collect 1 data for future evaluations and/or can be a read on demand device within the scope of this invention. Electronic modules can either have their own energy source or be activated by remote devices. In summary, electronic devices are known to generally provide whatever the user's needs may be. Some typical modules of the electronic type are disclosed in U.S. Pat. Nos. 4,862,486; 4,911,21; 5,218,861; and 5,573,610.

In general, a module is either imbedded within a rubber component of the tire, inserted in an interior pocket, fixed to the tire's surface, attached to the rim supporting the tire, or mounted in the valve stem. The location of the module influences the ability to measure and store engineering performance parameters such as inflation pressure, tire temperatures, number of revolutions or stress cycles and the like. Modules having electronic components, such as chips and circuit boards, are generally rigid or semi-rigid modules which are placed in contact with a very flexible tire. Tire deformations, shock and vibrations of the tire can be relatively large and exist over the life of the tire for literally millions of cycles, and adversely affect the life and performance of the chip. A module imbedded or attached to the tire which is relatively rigid compared with the tire itself will not survive the deformations and shock to which it is subjected. A need exists to provide a generally rigid module for encasing a rigid monitor chip and isolating the module and chip from the flexible tire.

The components or devices in the industry for accessing electronic information monitored and stored by an electronic module is generally not within the scope of this invention. In general, they involve some type of printed chip technology being a second electronic component. Some devices are remote hand held devices while others are directly or indirectly connected to other monitoring equipment located within the vehicle. Slip ring devices allow information to be electronically transmitted directly from the rotating tire and wheel to the onboard monitoring equipment. Remote communication with the electronic module is generally by radio frequency (RF) sound waves. However, RF communication is made difficult by the use of metallic materials within and around the tire due to steel reinforcing members in the tire and a metallic rim plus metallic vehicle parts. A relatively large antenna is generally needed to improve RF communication between the electronic components of any module, especially for broadcasting data from the module within the tire to a standoff monitoring device.

As a result of communication difficulties, another need exists to locate a module as free from interference from tire and rim components as possible. For example, the steel components within the tire influence the ability to send and/or retrieve data. Typical location and communication problems and some solutions are disclosed in U.S. Pat. Nos. 3,873,965; 4,246,567; 5,181,975; and 5,573,611 as well as European Patent No. 0 639 472 A1. The need is to support a module in a location that will work with any data transmission means used to communicate data to and from an module placed within the tire.

Tire monitoring modules are known to have a life somewhat different than the life of the tire, being either longer or shorter. Energy sources, if any, wear out and the fatigue life of other components are not adequate in many cases resulting in a shorter life for the module. The module may also need to be removed for reprogramming, for updating tire information and/or for better data collection. In addition, it may be desirable to make changes or repair the electronic components within the module or replace the electronic module with an updated module. A removable monitoring module having a longer life than that of the tire within which it is mounted may also be used. The module can be reused in another tire when the tire containing a module is removed from service or the use of a module is no longer desired.

The need to add a monitoring module within an existing tire may be created. As "sensor or monitor ready" tires replace only some of the tires on a vehicle, it may be desirable to make the remaining tires sensor ready, The need is to have a method for placing a module in a tire as an aftermarket device. The method should not significantly change the tire or the processes of building and using the tire. This same method could be further used to relocate one or several modules at various locations or multiple locations within a tire to achieve better or different information. The modules can include electronic modules or other modules such as inventory control modules.

A need remains to improve the affixing of a module to the inside of a tire. Although the prior art already discloses several modules imbedded within or affixed to the surface area of a tire, these attachment means do not isolate the module from the deformations, shock and vibrations of the tire. Any means for communicating with the module is also made more difficult when a module is imbedded within or affixed to the tire's surfaces. In addition, the desired utility for relocating, replacing or reusing the electronic module is limited in the art. A further need remains to provide an attachment means which can be integrated within a tire either during the manufacturing process or after the tire is manufactured.

Accordingly, an object of the present invention is to provide a tire and monitor retainer assembly for a monitor module that is easily installed and supported at a preferred location on the inside of the tire.

Another object is to provide a tire monitor retainer assembly for mounting a generally rigid monitor module to the inside of a tire in a manner to increase the life of the module and a rigid monitor chip carried therein.

Another object of the invention is to provide a tire and monitor module mount therein in which the module containing the monitor is spaced from the tire's interior surface.

Another object of the present invention is to provide a tire and monitor retainer assembly that allows a module to be removed to be inspected, repaired and/or updated in hardware and/or stored data; as well as relocated to another tire or replaced by another module.

Yet another object of the present invention is to provide a tire and monitor retainer assembly which allow aftermarket monitoring and information modules to be incorporated within an existing tire.

A further object of the present invention is to provide either a reinforced or unreinforced rubber ply with a fastener assembly placed within a tire for receiving, holding and supporting a module isolated to the inside of a tire.

Yet another object of the present invention is to allow the module to adjust itself while being retained within the tire so that forces and deformations from the rolling tire are resisted and the fatigue life of the module and module mount is extended.

SUMMARY OF THE INVENTION

The above objectives are accomplished according to the present invention by providing a tire and tire monitor retaining assembly and method wherein a tire monitor module is carried adjacent the inside surface of the tire wherein a retaining system includes a rubber ply and a retainer assembly for securing a monitor or data module on the rubber ply within the tire. The tire monitor retainer assembly and method of this invention provides a cost effective and reliable means for incorporating a module within a tire. A further problem in the trucking industry is to provide a monitoring system that includes the module within the tire in a cost effective manner. The problem is further complicated by the need to have a monitoring module that does not require special handling of the tires or special training for tire changers and other maintenance personnel. The need to use generally standard maintenance methods and materials, such as rubber type patches and fastener devices is most desirable both from a personnel training point of view and in view of the overall cost of supporting a module. Ease of installing and removing the electronic module is desirable. Typical fastener devices known in the industry are disclosed in U.S. Pat. Nos. 4,938,645; 5,468,108; and 5,718,025. An example of a typical rubber patch is the tire repair system manufactured by Tech International of Johnstown, Ohio.

According to the present invention, a monitored vehicle tire includes a vehicle tire having an interior surface defining an interior tire cavity. Advantageously, a tire monitor retaining assembly includes a rubber ply having a first side affixed to the interior tire surface at a predetermined location within the tire cavity. A monitor module is carried by a second side of the rubber ply for containing a monitor which monitors the tire information. A retainer assembly is provided for securing the module to the rubber ply wherein a second side of the rubber ply is generally exposed to the tire cavity. A standoff or isolating mount can be disposed between the rubber ply and the monitor module for spacing the module from the ply to improve the durability of the module and a monitor carried in the module. The retainer assembly of the invention preferably includes a first fastener part carried by the rubber ply and a second fastener part carried by the monitor module which cooperate to securely fasten the module to the ply. The standoff or isolation mount of the invention may be provided in various ways. For example, indexing or ratcheting elements may be provided on the first and second fastener parts to fix and space the module from the ply and tire. The first fastner part may include an elongated shaft received in a retainer opening of the module. The shaft has a length sufficient for the module to ride out on the shaft under centrifugal force and be retained by a retainer element a desired distance from the ply. Alternatively, the standoff distance can be assured by the addition of a resilient isolating element or mount placed between the second side of the rubber ply and the bottom surface of the monitor module. The isolating element material can be in the form of a sponge rubber layer or a washer around the shaft of a fastener assembly.

In one aspect, the first fastener part includes a shaft supported by and extending from the rubber ply and a button retainer located at the remote end of the shaft. The second fastener part may include a retainer opening formed in the module having an edge for frictionally receiving the button shaft to position and retain the module within the tire's cavity. The module may include an entrance opening to initially receive the first fastener device and a transfer slot allowing movement of the shaft from the entrance opening to the retainer opening to support and retain the module during normal use of the electronic module, whereby the module is removable from the tire.

Various other aspects of the invention are provided by various retainer assemblies having combinations of first and second fastener parts associated with the rubber ply and the module, The first fastener parts of the tire monitor retainer assembly contact second fastener parts of the module to correctly position the module within the tire's cavity. For example, the first fastener parts may be provided in the form of at least one elongated strap having a pair of free ends. The strap is placed through a pocket formed in a folded rubber ply so that a pair of free ends of the strap extend from the folded rubber ply. Connecting the pair of free ends of the strap or straps together holds the module in place adjacent the rubber ply within the tire. The strap can also be provided in the form of two semi-rigid straps that have locking elements that interconnect the two semi-rigid straps together with the pocket of the rubber ply.

The invention includes a monitor ready tire and method for affixing a tire monitor to an interior surface of a vehicle tire. The method includes the first step of providing a rubber ply having first and second opposed sides. The second step includes affixing the first side of the rubber ply to the interior surface of the tire before curing, during curing, or after curing of the tire. The third step includes securing a module to the rubber ply adjacent the second side for containing a monitor which monitors tire information. Further aspects of the method include preconditioning an area of the inner surface of the tire to accept the rubber ply by removing contaminants from the area to thus provide a "monitor-ready" tire.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 5A is a perspective view of another embodiment of the tire monitor retainer assembly of the present invention with another single fastener device of the retainer assembly holding the module adjacent a rubber ply affixed to the inner surface of the tire;

FIG. 5B is a perspective view of the other embodiment of the rubber ply and retainer assembly of FIG. 5A showing break away portions of a four layer rubber ply including a reinforced layer and the other fastener device made integral with the reinforced layer to extend into the tire's cavity;

FIG. 6 is a perspective view of a further embodiment of the tire monitor retainer assembly of the present invention with the retainer assembly including an elongated strap having contacting hook and loop elements of a retainer assembly to help retain the module adjacent a reinforced rubber ply near the inner surface of the tire;

FIG. 7 is a perspective view of the embodiment of FIG. 6 showing the reinforced rubber ply being a folded reinforced rubber ply having a strap pocket for holding the elongated strap in a position within the tire to be wrapped around the module;

FIG. 14 is a perspective view of a further embodiment of a tire monitor retainer assembly having a folded reinforced rubber ply affixed to the inside surface of a tire forming a strap pocket to receive a retainer assembly including two semi-rigid straps each having a slotted retainer bar extending from the strap pocket to engage edges of the module and retain the module adjacent the folded reinforced rubber ply near the inner surface of the tire;

FIG. 15 is a perspective view of the folded rubber ply of the embodiment of FIG. 14 with the two semi-rigid straps, with the slotted rectangular shaped fastener bars at their outer end, being placed within the strap pocket of the folded reinforced rubber ply; and FIG. 16 is a cross-sectional view taken along line 16—16 in FIG. 15 showing the two semi-rigid straps interlocked within the strap pocket of the folded reinforced rubber ply according to the embodiment of FIG. 14.

DESCRIPTION OF PREFERRED EMBODIMENTS

Figure 1:
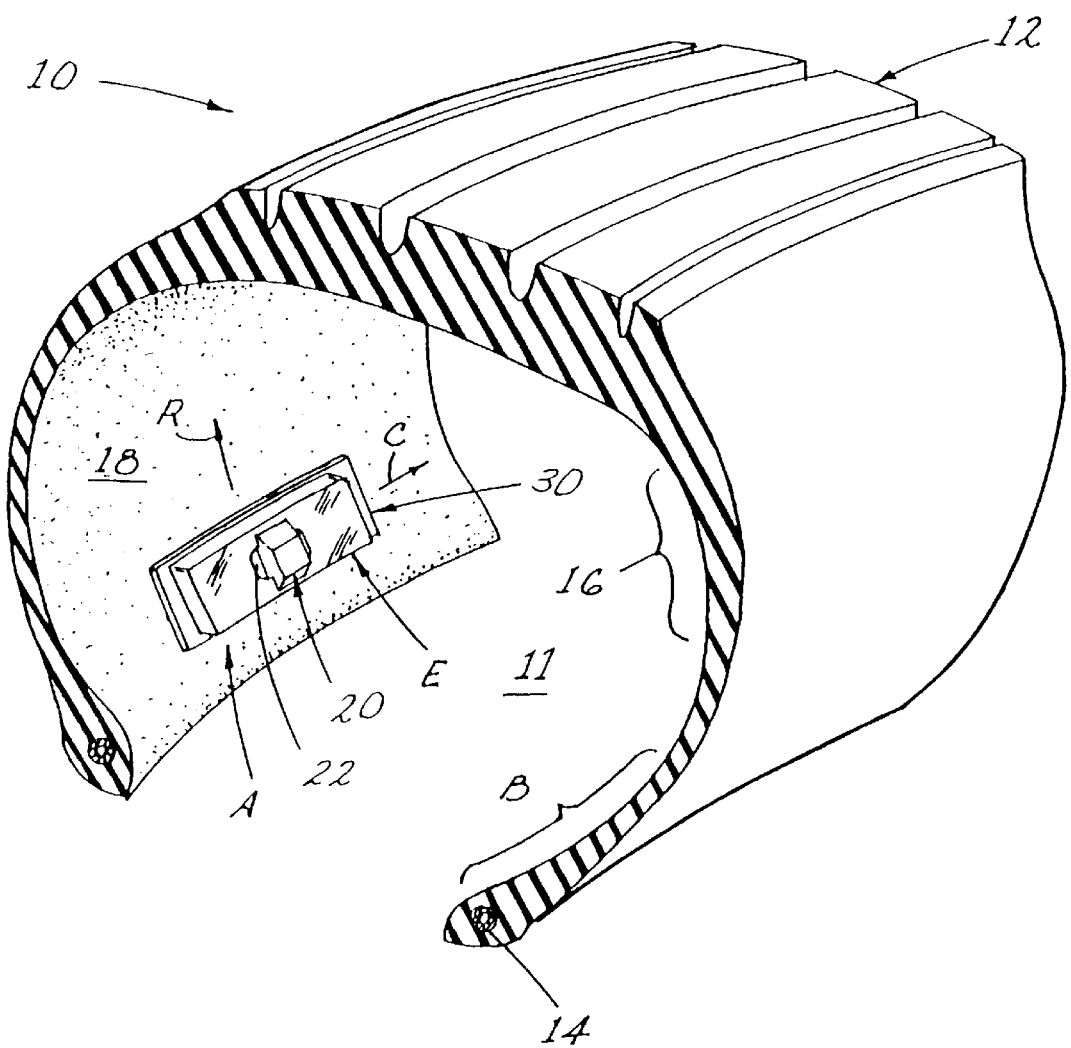
FIG. 1 is a perspective view of a tire section showing a tire monitor retainer assembly of this invention to include a module supported within an internal cavity of the tire.

Referring now to the drawings, the invention will be described in more detail. A segment of a monitored tire 10 for use on a vehicle and having a tread 12 for contacting a support surface is illustrated in FIG. 1. A monitor module "E" which may have electronic components for storing, monitoring and/or recording information about the tire and its operating environment, is supported and retained within the tire to form a tire monitor system or a vehicle tire monitoring apparatus "A". Placing the module inside the tire makes it theft and tamper resistant and helps to keep it clean. According to the invention, monitor module E is supported in an offset position to the inside of the tire using a rubber ply 30 affixed to an inner surface 18 of the tire. The monitor assembly includes a retainer assembly, designated generally as "G", for securing the monitor module to the rubber ply in the cavity of the tire away from the inner surface of the tire. A first fastener part of the retainer assembly holds the module adjacent the rubber ply within the tire. Preferably, fastener part 20 of the retainer assembly helps to hold the module at a predetermined "standoff" distance with respect to the rubber ply. In one aspect, the module is provided with a retainer opening 22 as a second fastener part of the retainer assembly.

A reinforced or an unreinforced rubber ply 30 can be used within the scope of this invention, with the preferred rubber ply being unreinforced. The amount of area in contact between tire inner surface 18 and monitor assembly A is selected to give adequate support to retain the module generally stationary with respect to the tire during the nominal operation of the vehicle. The mass and size of monitor assembly A including the module determines the selection of the surface area of contact with the tire. The location of the monitor assembly A within the tire is also chosen to control the effect of inertial forces, such as shock and other tire transmitted deformations, on the monitor assembly including the module. Inertial forces and bending deformations of the tire in the radial "R-direction" as well as the circumferential "C-direction" must be considered, as shown by R and C in the figures. Bending perpendicular to the R-C plane must also be considered. The durability of the tire monitor retainer assembly is greatly enhanced by an isolation mount for isolating the module from tire transmitted deformations, vibrations and shock loads. The unique design of the present invention provides this isolation. The illustration of FIG. 1 shows a retainer opening 22 in the module as a second fastener part of the retainer assembly for holding the module adjacent to the rubber ply.

The tire monitor retainer assembly or monitored vehicle tire and method of this invention can be affixed at any location to the inner surface of the tire. The preferred location is adjacent the bead area "B" of the tire, as illustrated in FIG. 1. This location generally has less tire deformation, shock and vibrations and is at a location somewhat easier for monitoring tire information available through the module; as well as being convenient for installing and removing the module. Sidewall area 16 can also be a practical area for locating the module. The location in the tire for receiving the rubber ply must be convenient so that a surface area can be conditioned to provide complete adherence with the rubber ply.

Figure 2:
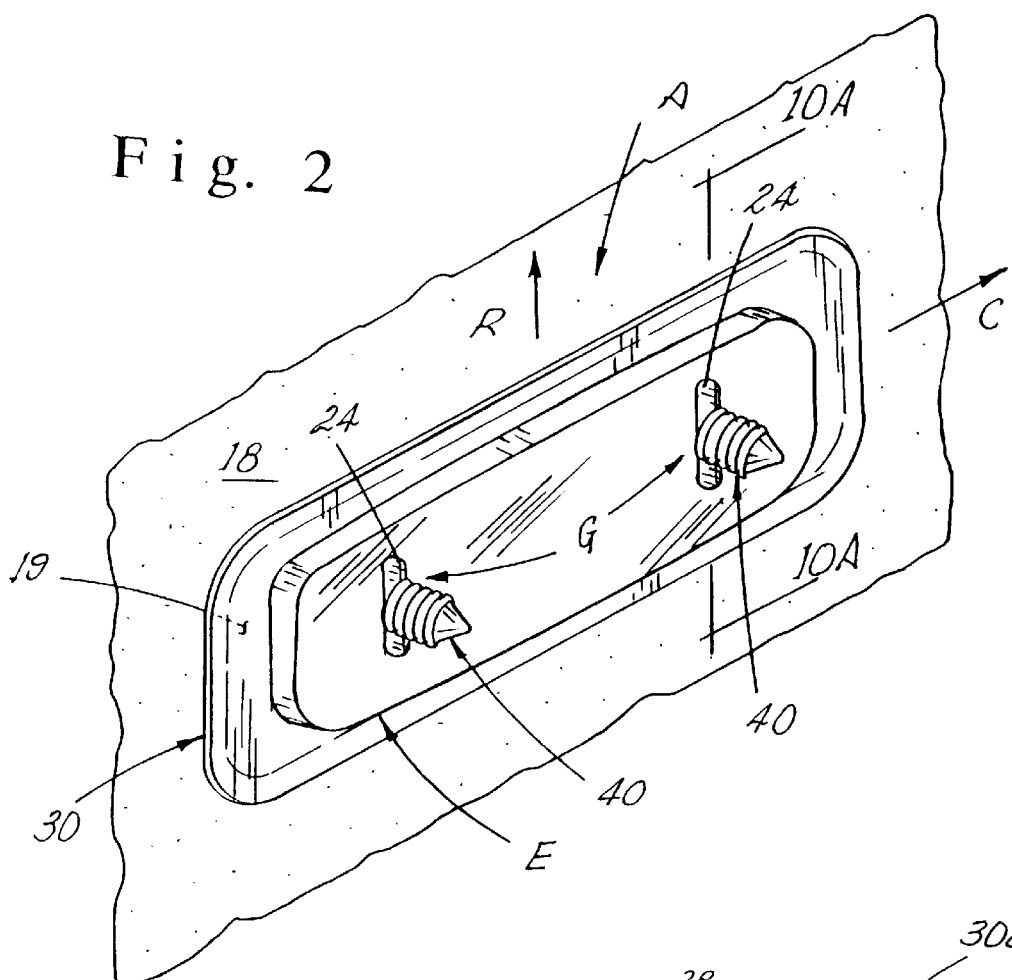
FIG. 2 is a perspective view of one embodiment of the tire monitor retainer assembly of the present invention with a retainer assembly having a pair of fastener devices holding the module adjacent a rubber ply near an interior surface of the tire.
Figure 3:
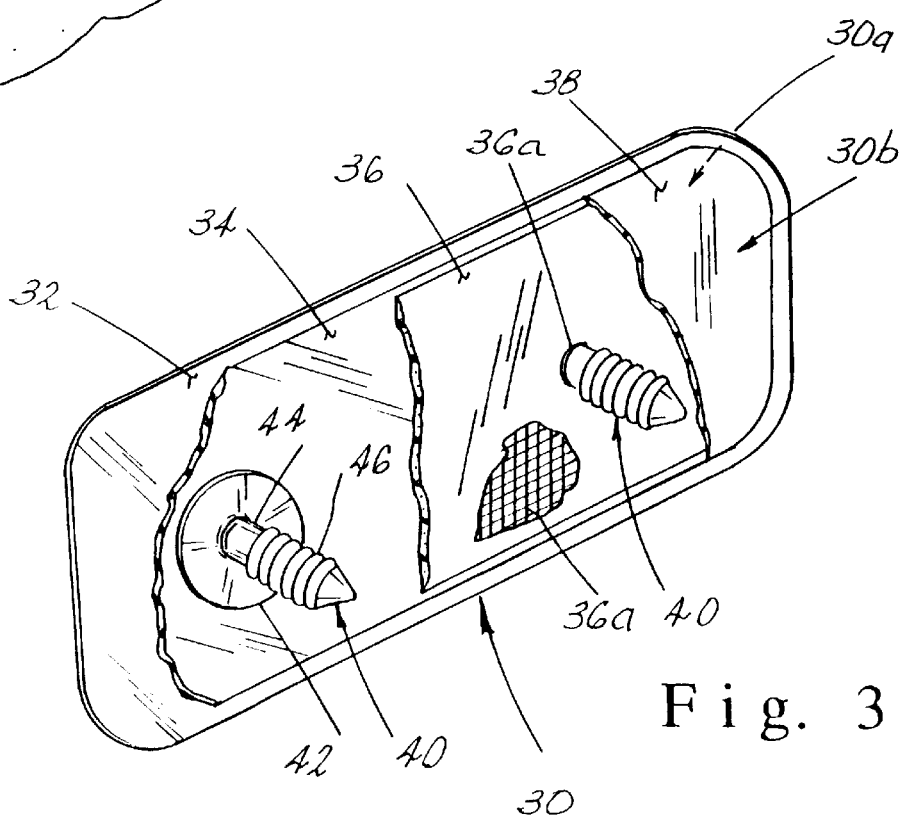
FIG. 3 is an perspective view of the retainer assembly of the invention showing break away portions of the rubber ply with four rubber layers carrying two fasteners positioned to extend into the tire's cavity and with reinforcing members formed integral with one rubber layer according to an aspect of the invention of FIG. 2.

The monitor module assembly illustrated in FIGS. 2 and 3 includes rubber ply 30 having a first side 30a that coexists with the inner surface of the tire at the interface and a second side 30b exposed to a cavity 11 of the tire 10 (see FIG. 1). The first layer is referred to as a sticky mix layer. This non-reinforced layer can be adhesively affixed to the tire when using a chemically cured rubber compound. The rubber ply can also be affixed using a "cure-in" type patch which cures chemically rather than with heat and pressure. A third layer 36 provides adequate strength by including reinforcing members 36a extending in both the radial R-direction and the circumferential C-direction. The third layer is referred to as a reinforcing layer. An optional second layer 34 is placed between the first and third layers to generally provide a transition between the strains from the tire itself to the strains of the reinforced rubber ply. An optional fourth layer 38 covers layers two and three. The fourth layer is referred to as a covering layer that forms the inner second side of the rubber ply. Rubber materials used for rubber layers 32–38 are those commonly used in the industry for sticky-mix, bonding, reinforcing and covering layers. For example, a typical four layer rubber patch is the "tire repair systems" (catalog no. 169) as manufactured by Tech Industries of Johnstown, Ohio. In one aspect, the rubber ply may include four layers integrally formed to make a reinforced rubber ply. A first layer 32 extends radially and circumferentially outward of the other layers and is a rubber compound to provide a first surface of the rubber ply that adheres very well to inner surface 18 of the tire at a supporting interface 19.

A retainer assembly G holds module E on rubber ply 30, as illustrated in FIG. 2 for this embodiment of the invention. Rubber ply 30 has its first side 30a affixed to the inner surface 18 of the tire at a support interface 19.

In the illustrated embodiment of FIG. 3, there are a pair of first fastener parts 40 having a base 42 imbedded between the second layer 34 and the third reinforced layer 36 of the rubber ply 30. Each first fastener part 40 has a shaft 44 that extends from base 42 at second side 30b of the rubber ply with standoff, indexing or ratchet elements 46 at the other end of the shaft. Shaft 44 extends through openings 36a in reinforced layer 36 as well as coexisting openings in cover layer 38.

Module E may include a second fastener part in the form of a pair of retainer openings 24, as illustrated in FIG. 2. The module is attached to the reinforced rubber ply by passing fastener shafts 44 through the retainer openings. Retainer openings 24 have edges which make the openings smaller than the outer dimension of standoff elements 46 so that the standoff elements engage the edges of the retainer openings and hold the module supported by the reinforced rubber ply. The retainer openings are elongated for providing for easy installation of the module and to allow the module to slightly adjust its position relative to the reinforced rubber ply during running of the vehicle. This adjustment relieves stresses on the support system. The fastener part 40 can be made of any material commonly used for fasteners, but is preferably made of a plastic material such as a nylon or a molded rubber. Alternatively, standoff elements may be placed on the second fastener part to engage the first fastener part.

Figure 4A:
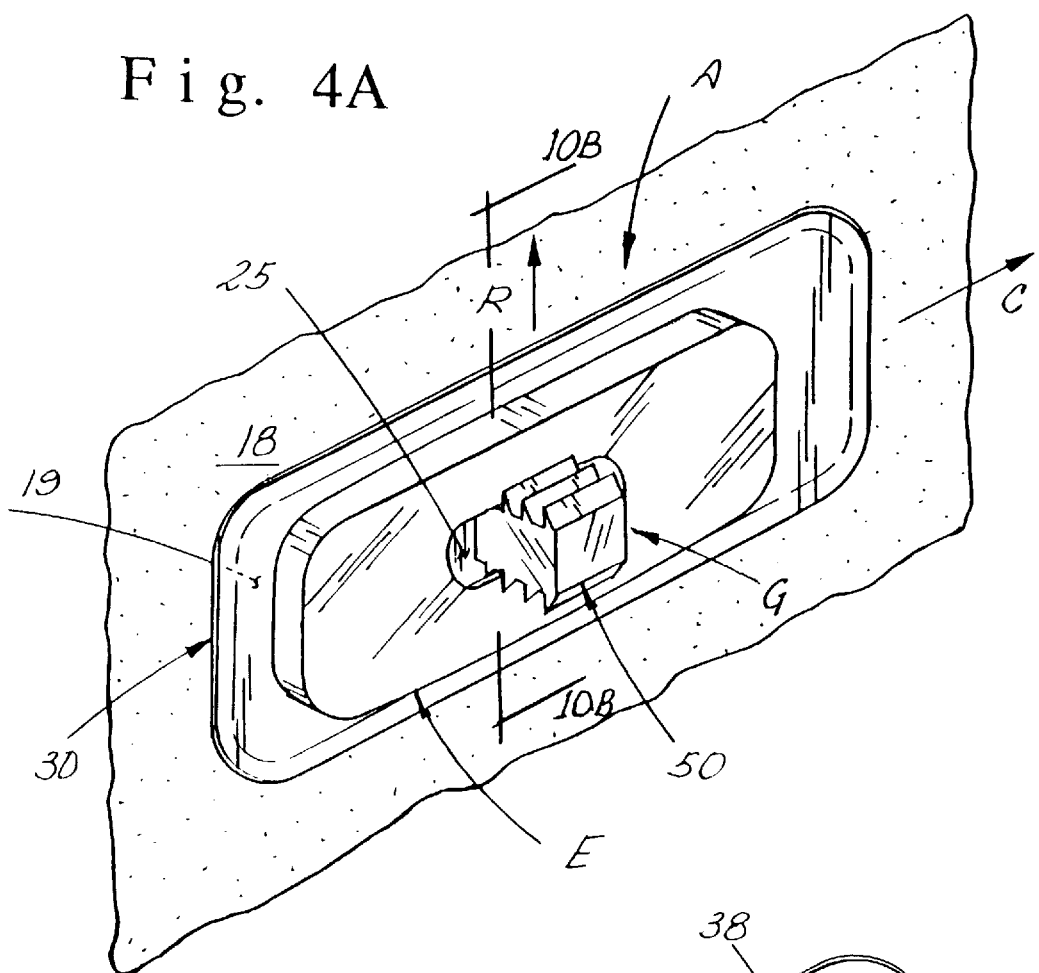
FIG. 4A is a perspective view of another embodiment of the tire monitor retainer assembly of the present invention with a single larger fastener device of the retainer assembly holding the module adjacent a rubber ply affixed to the inner surface of the tire.
Figure 4B:
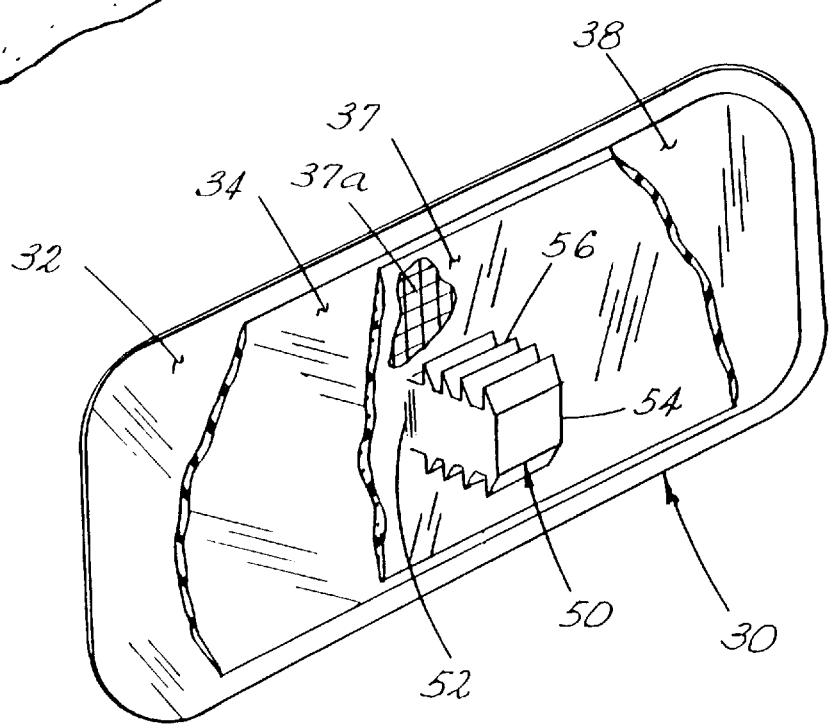
FIG. 4B is a perspective view of the embodiment of the rubber ply and retainer assembly of FIG. 4A showing break away portions of a four layer rubber ply and the single fastener device made integral with one layer and positioned to extend into the tire's cavity and further with reinforcing members formed integral with the one rubber layer and the fastener device.

According to further illustrated embodiments of the invention, tire monitor retainer assembly A includes providing a similar rubber ply as previously described and a retainer assembly G which includes a first fastener part 50, as illustrated in FIGS. 4A and 4B. A conditioned surface area is provided on the inner surface 18 of the tire for attaching the first side of the reinforced rubber ply 30 to the inner surface at interface 19. The module E is preferably aligned with the radial R-direction and the circumferential C-direction of the tire. The longer dimension of the module is preferably aligned with the C-direction to avoid large tire deformations. The reinforced rubber ply may again have four layers, or two layers in another aspect. First layer 32, second layer 34 and fourth layer 38 are essentially the same as described above. A third layer 37 is provided with reinforcing members 37a. This reinforcing layer 37 is shown in FIG. 4B as being formed as an integral part with a first fastener part 50.

Alternatively, the third layer can be unreinforced within the scope of this invention. The fastener part has a shaft 54 carried by and formed with third layer 37 and extending from the second side of the rubber ply into the cavity of the tire from its base 52. The shaft includes standoff, indexing or ratchet elements 56 along two outer sides of the shaft to engage second fastener parts being edges of retainer opening 25 of the module. Fastener part 50 may be rectangular in shape. Other shapes such as round, oval, elliptical, polygonal and the like are within the scope of this invention.

In the illustrated embodiment of FIG. 4A, module E has a single retainer opening 25 to accommodate single fastener device 50. Edges 25a of the retainer opening provide second fastener parts with an opening width dimension less than the outer dimensions of the shaft 54 when indexing elements 56 are included. The difference in these dimensions allows a friction fit between fastener part 50 and the opening edge to retain the module supported by rubber ply 30. The retainer opening may be elongated in one direction to provide for easy installation of the module and to allow for adjustments in the position of the module relative to the rubber ply during running of the vehicle. Multiple retainer openings and fastener parts of the type illustrated in this embodiment of the invention may also be utilized. However, the use of a single shaft has been found highly advantageous.

According to the illustrated embodiment of FIGS. 5A and 5B, the tire monitor retainer assembly A includes a rubber ply 130 and a retainer assembly G having a first fastener part 150 carried by the rubber ply. The ply and fastener part are preferably integrally molded. There is a conditioned surface area on the inner surface 18 of the tire to which a first side 130*a* of rubber ply 130 is affixed at interface 19 such that module E is generally aligned with the radial R-direction and the circumferential C-direction of the tire. The reinforced rubber ply again has at least two layers, i.e. a sticky-mix layer and a rubber layer. For the four layer rubber ply, a first sticky-mix layer 132, a second bonding layer 134, a third reinforced layer 137 and a fourth covering layer 138 are essentially the same as described above. The third layer 137 can be provided with reinforcing members 137*a*. For the two layer rubber ply, second and fourth layers can be removed and the third layer can be made with reinforcing members or without reinforcing members. These options are discussed in more detail below when discussing the cross-sections of FIGS. 11A, 11B and 11C. The layer 137 can be formed as an integral part with fastener part 150, as illustrated in FIG. 5B.

Fastener part 150 has a resilient rubber-like mounting shaft 152 extending into the cavity of the tire from the second side 130*b* of rubber ply. The shaft contains a retainer element or button 154 with optional flat sides 156 that engage second fastener parts defined by a first retainer opening 125 of module E. The fastener part is shown to be oval in shape. Other shapes such as round, rectangular, elliptical, polygonal and the like are within the scope of this invention. Module E preferably has a second entrance opening 124 to initially receive first fastener part 150, as illustrated in FIG. 5A. A transfer slot 124*a* between entrance and retainer openings 124 and 125 provides for installing the module in an installed position as illustrated in FIG. 5A. Installing the module places it in a position to be supported by the retainer assembly G from the rubber ply. The module is initially turned 90 degrees from its installed position and button 154 is forced through the first opening 124. A lubricant can be placed on the button and shaft to assist in installing the module. The module is then turned to its installed orientation and the shaft of the fastener device is forced through slot 124*a* into second retainer entrance opening 125 into a friction fit. Retainer opening 125 is made with second fastener part edges that interface with the first fastener part 150, including the button 154, and hold the module in a predetermined orientation within the cavity of the tire. The retainer opening is made to be elongated in one direction to provide for easy installation of the module and to hold the module in a properly installed orientation relative to the rubber ply. Reversing the above procedure allows the module to be removed from the tire.

Figure 11A:
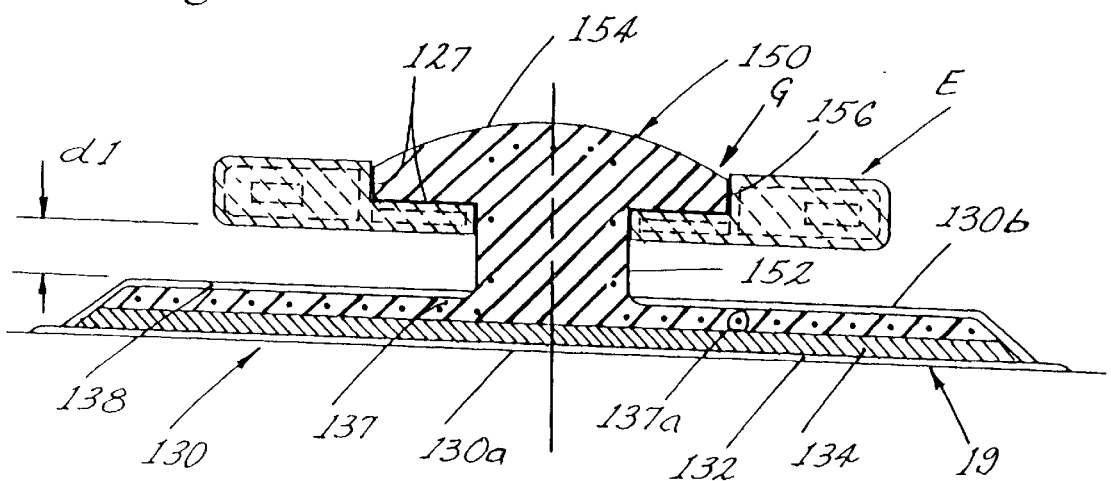
FIG. 11A is cross-sectional view taken along line 11A—11A of FIG. 5A showing four layers of the rubber ply and a first fastener part formed to be integral with a third reinforced layer of the four layers, said first fastener part having a shaft with a button end portion that engages edges of retainer openings within the monitor module.

In an advantageous aspect of the invention, shaft 152 may be a sufficient length so that module E may be forced outward along shaft 152 to achieve a predetermined offset distance d1 from the second side 130*b* of the rubber ply (FIG. 11A). For this purpose, at least one isolation mount in the form of standoff, indexing or ratchet elements (46, 56) may be formed on shaft 152 to maintain the module at a proper offset distance from second side 130*b* of the rubber ply and/or to keep the module from being removed from the tire. Alternatively, as in the embodiments illustrated in FIGS. 11A–11C, centrifugal force on module E may be sufficient and utilized to maintain the module offset from ply 130 and the tire. In addition, shaft 152 may be tapered to bias the module toward the button. In another aspect of the invention, an isolation mount may be provided by standoff elements placed on the second fastener part to engage the first fastener part.

In the illustrated embodiment of FIGS. 6 and 7 module E is retained and held in a proper location within the tire when using a retainer assembly G comprising a first fastener part in the form of a strap 331 extending in the circumferential C-direction, and folded circumferentially around the module. There is a folded rubber ply 330 having a strap pocket 338 for receiving the single continuous strap. The rubber ply is bonded together at interface 339 at both sides of the strap pocket forming an first layer 330*a* and a second layer 330*b* of rubber ply 330. The folded rubber ply is preferably reinforced with reinforcing members 336, and the rubber ply is positioned within the tire so that the reinforcing members extend in the radial R-direction. Once again, reinforced rubber ply 330 may be affixed at a first side 330*c* to the inner surface 18 of the tire at a support interface 19 using a sticky-mix layer. A first strap end 332 extends from one end of the strap pocket and a second strap end 334 extends from the other end of the strap pocket. Strap 331 has parallel reinforcing members 333 generally extending in the circumferential C-direction. Module E with its internal electrical components is placed in a position to be retained adjacent a second side 330*d* of the rubber ply and the two ends of the strap are wrapped around the module in the circumferential C-direction. For this purpose, a hook and loop fastener system 320 may be carried by opposing strap ends. The loop elements 335*a* are attached to one strap end 332 and the hook elements 335*b* are attached to the other strap end 334. Placing the hook elements 335*b* in contact with the loop elements 335*a* at a retainer interface 321 connects together the two free ends 332 and 334 of the continuous strap 331 to retain and hold module E. A second fastener part is provided by retainer openings 331*a* formed as cutouts at opposite ends of the module. Edges of the cutouts help retain the strap in a proper position around the module (FIG. 6). A further aspect of retainer assembly G or 320 can be realized by adding a retainer bar with retainer pins (not shown) to help hold the strap ends in constant contact with one another.

Figure 8:
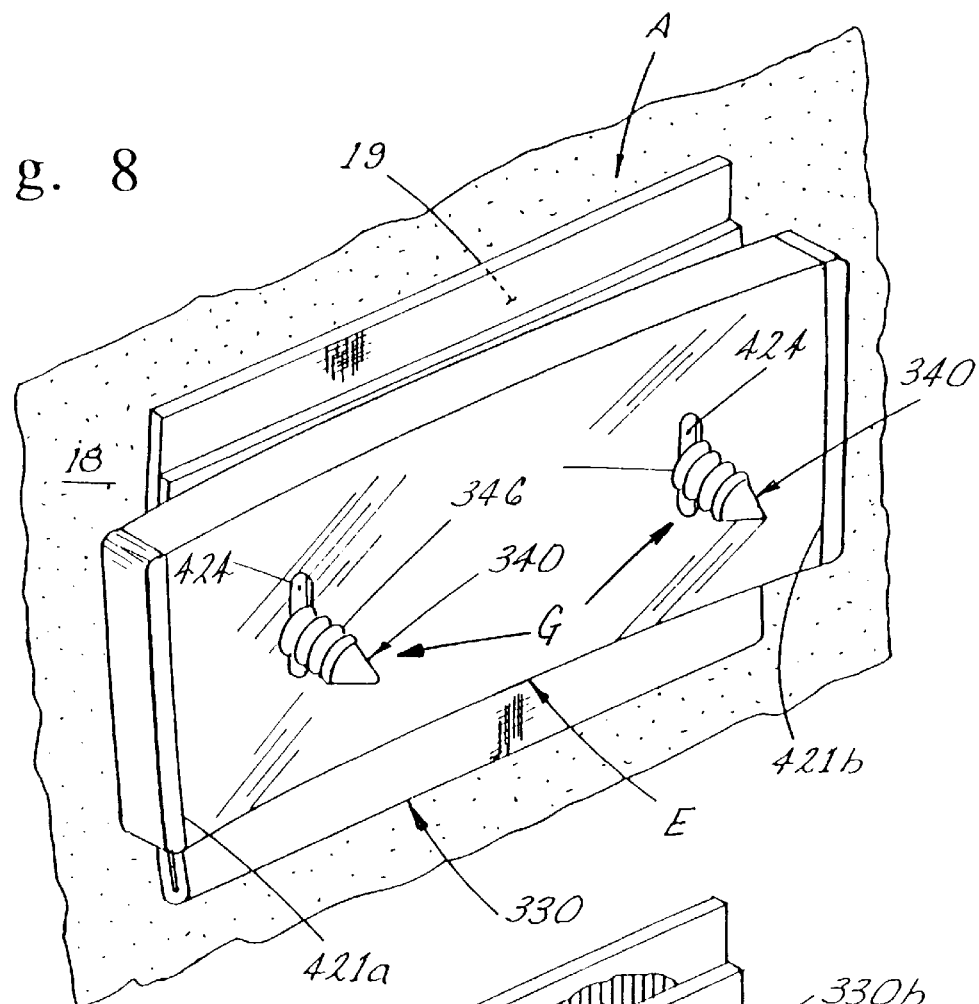
FIG. 8 is a perspective view of yet another embodiment of the tire monitor retainer assembly with a pair of shafts of a fastener device of the retainer assembly extending through retainer openings in the module to retain the module adjacent the folded reinforced rubber ply near the inner surface of the tire.
Figure 9:
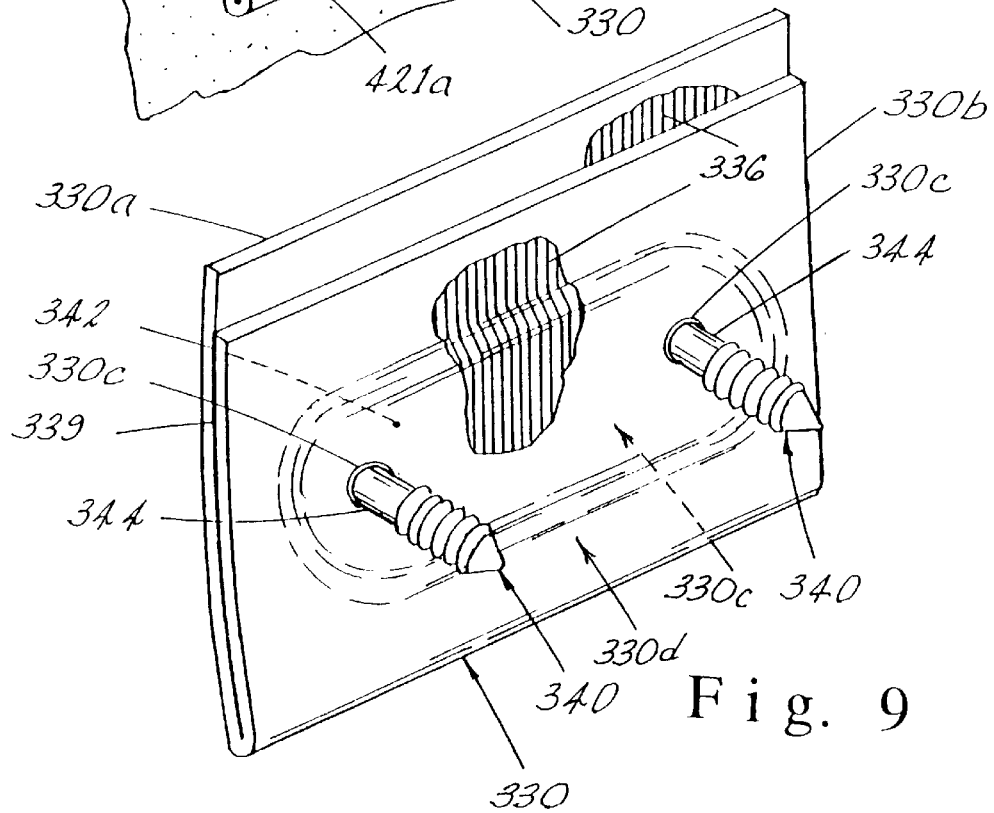
FIG. 9 is a perspective view of the embodiment of FIG. 8 showing the folded reinforced rubber ply retaining a base of the fastener device within a strap pocket for holding the fastener device in a position to extend the two shafts of the fastener device within the cavity of the tire to be in a position to receive the module.

In the illustrated embodiment of FIGS. 8 and 9 a retainer assembly G includes a first fastener part 340 carried by a folded reinforced rubber ply 330. The fastener part includes a common base 342 having two shafts 344 extending from the common base. The reinforced rubber ply is folded to embed the base between a first layer 330*a* and a second layer 330*b* of the folded reinforced rubber ply at an interface 339 between the layers. The layers are bonded together at the interface where possible and are bonded to the common base of the fasteners. Openings 330*c* in the second layer are provided for shafts 344 to extend from the folded reinforced rubber ply. As before, folded reinforced rubber ply 330 is affixed at a first side 330*c* to the inner surface 18 of the tire at a support interface 19. A second complementary fastener part carried by module E includes retainer openings 424 provided in the module, as illustrated in FIG. 8. Shafts 344 extend through the retainer openings into the cavity of the tire and have standoff, indexing or ratchet elements to engage edges of the retainer openings and hold module E in contact with folded reinforced rubber ply 330 within the cavity of the tire. Once again, the retainer assembly G provides for adjustments in the position of the module relative to a second side 330d of the folded reinforced rubber ply so that varying offset distances may be provided.

Figure 10A:
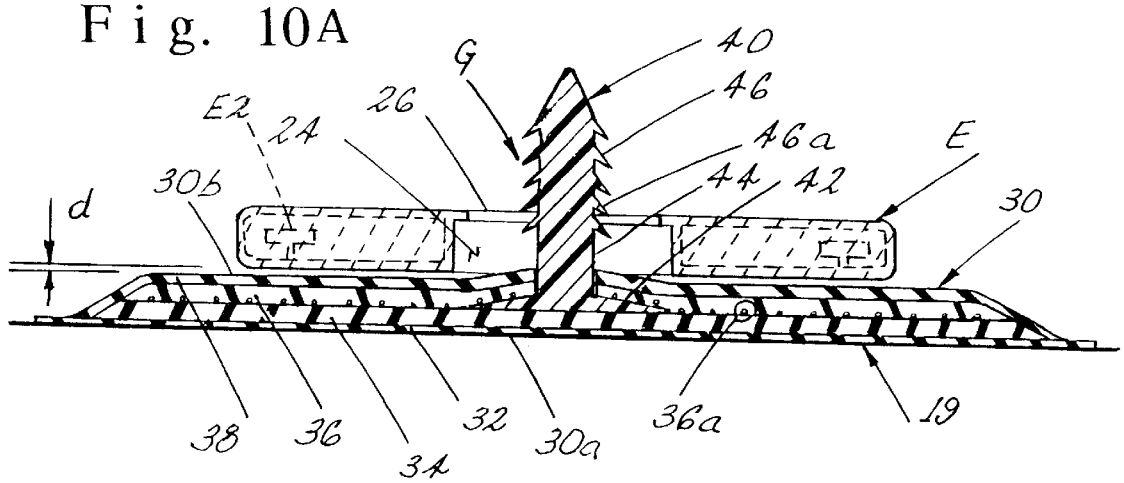
FIG. 10A is cross-sectional view taken along line 10A—10A of FIG. 2 showing four layers of a reinforced rubber ply, a retainer assembly having a first fastener part with a base positioned between second and third layers of the reinforced rubber ply and a shaft extending from the base having standoff, indexing or ratchet elements that engage second fastener parts of the module.
Figure 10B:
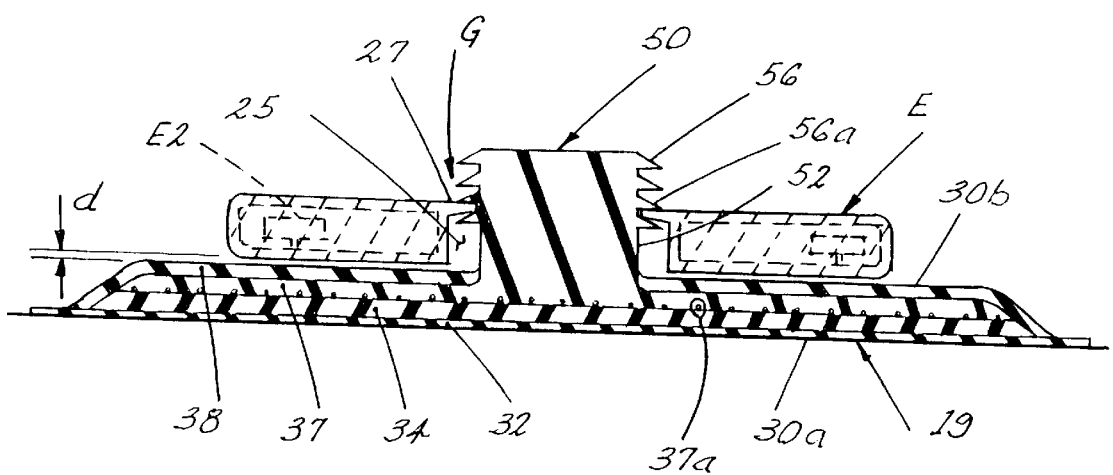
FIG. 10B is cross-sectional view taken along line 10B—10B of FIG. 4A showing four layers of a rubber ply, a fastener device formed to be integral with a third reinforced layer of the rubber ply and a shaft of the first fastener part with standoff elements that engage second fastener parts of the module.

Describing in more detail the offset distance "d" provided by the retainer assembly G of the invention, reference is made to the cross-sectional drawings of FIGS. 10A and 10B, which are sections taken from FIGS. 2 and 4. Rubber ply 30 has a first side 30a attached to the inner surface of the tire at an interface 19. Shaft 44 of the first fastener part extends outward through third and fourth layers 36 and 38 of the rubber ply. Module retainer opening 24 receives shaft 44. Standoff, indexing or ratchet elements 46 engage the second fastener part edges 26 within the retainer opening of the module E, when the module is mounted. The module is forced to be near the second side of the rubber ply. When the module E with its electronic components (i.e. E2) is installed, one of the standoff elements 46a is in a position to contact edge element 26 and hold the module in an optimum position with respect to the rubber ply. After being installed, the module has a preferred location offset distance "d" from rubber ply 30. This position being one to provide proper operation of the module and an extended service life for the tire monitor retaining assembly. The offset distance has a value in the range of about one millimeter to about five millimeters, with three millimeters being preferred. Alternatively, the standoff distance "d" can be assured by an isolation mount including the addition of a resilient isolating material placed between the second side of the rubber ply and the bottom surface of the monitor module. For example, the isolation mount material can be in the form of a sponge rubber layer or a flexible washer placed around a shaft of the first fastener part.

The fastener device of the retainer assembly can be made of any material commonly used for fasteners, but is preferably made of a plastic material such as nylon or a molded rubber. A typical nylon ratchet fastener device is catalog number PC47486 made by TRW, Inc. of Lyndhurst, Ohio.

FIG. 10B is a cross-sectional view is taken along line 10B—10B of FIG. 4A. Rubber ply 30 has a first side 30a affixed to the inner surface 18 of the tire at an interface 19. Fastener part 50 is uniquely made to be an integral part of third layer 37 of ply 30, and includes reinforcing members 37a. Shaft 54 of fastener part 50 extends outward through fourth layer 38 of ply 30 from a base of the shaft. Module retainer opening 25 receives the shaft. Shaft 54 has standoff, indexing or ratchet elements 56 at its outer end that engage edges of the edge elements 27 of the retainer opening. When the module with its electrical components (i.e. E2) is installed in its preferred location, one of the standoff elements 56a is in a position to contact at least one edge 27 of the module and hold the module in an optimum position with respect to the reinforced rubber ply. After being installed, the module, once again, has a preferred location offset distance "d" from the second side 30b of rubber ply 30. This position and distance being a predetermined placement to provide proper operation of the module and an extended service life for the tire monitor retainer assembly. In another aspect of the invention, an isolation mount may be provided by standoff elements placed on the second fastener part to engage the first fastener part.

Figure 11C:
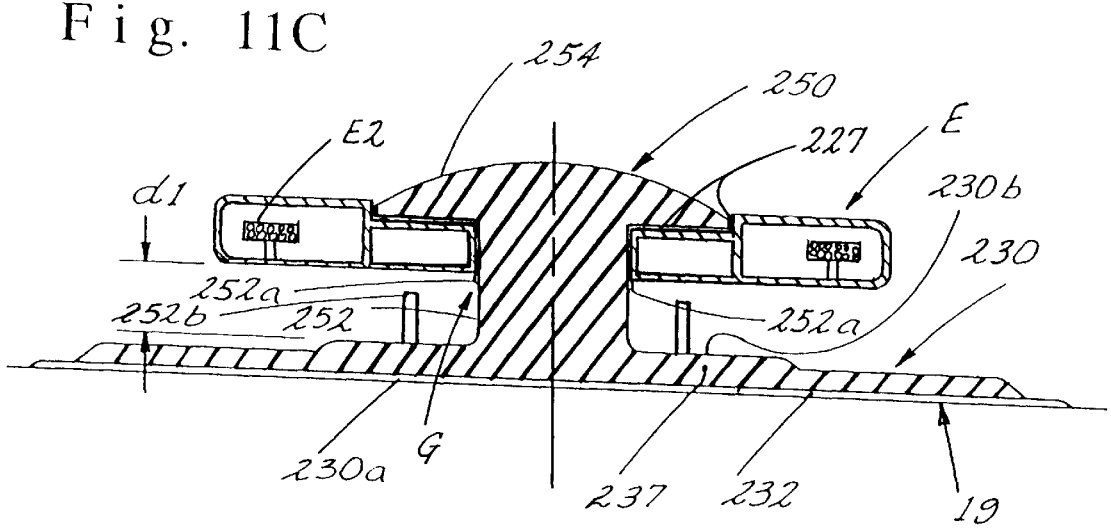
FIG. 11C is a cross-sectional view of a rubber ply having two unreinforced layers formed integral with a fastener device of the retainer assembly for holding the module by engaging edges of retainer openings within the module.
Figure 11B:
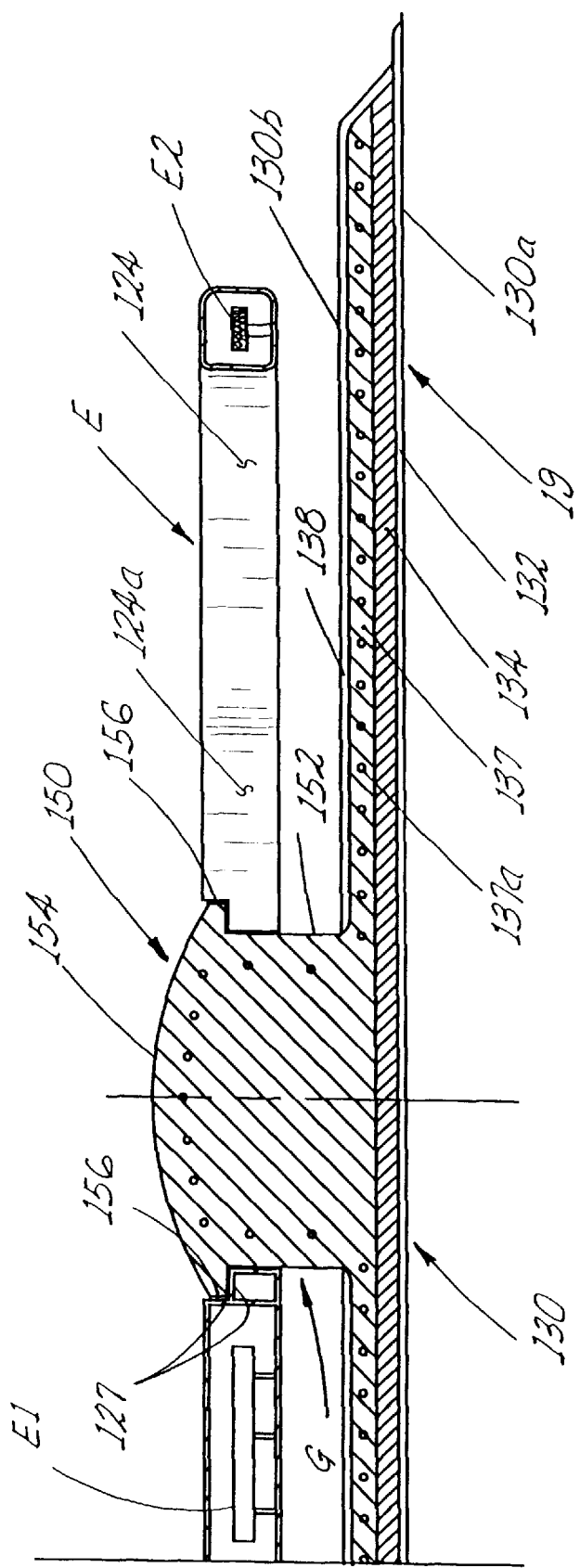
FIG. 11B is cross-sectional view taken along line 11B—11B of FIG. 5A showing four layers of the rubber ply and a first fastener part, formed to be integral with a third reinforced layer of the four layers, said first fastener part having a shaft with a button end portion that engages edges of openings within the module.

Other variations and features of a standoff retainer assembly G are illustrated in the sectional views of FIGS. 11A–11C. FIGS. 11A–11B are sections taken from FIGS. 5A and 5B. Rubber ply 130 has a first side 130a attached to the inner surface 18 of the tire at an interface 19. Fastener part 150 is uniquely made to be an integral part of the third layer 137 having reinforcing members 137a which extend into the stem and button parts of the fastener device. Shaft 152 of the fastener device extends outward through fourth layer 138. Module retainer opening 125 receives the shaft of the fastener. The shaft 152 has retainer element or button 154 at its outer end with sides 156 that engage edges of edge elements 127 of retainer opening 125 of module E, when the module with electrical components (i.e. E1 and E2) is installed in its preferred location. Edges 127 can be recessed so that button 154 can be visually aligned and fixed with the module when properly installed. After being installed, the module has a preferred location with a relatively large offset distance "d1" from rubber ply 130. The button 154 is in a position to contact edge or edges 127 of the module and hold the module in an optimum position with respect to reinforced rubber ply 130. This position, once again, being a placement to provide proper operation of the module and an extended service life for the monitor assembly. The offset distance has a value between about one (1) millimeter and about five (5) millimeters. The preferred offset distance is about three (3) millimeters.

In FIG. 11B, entrance opening 124 receives button 154 and shaft 152 of fastener part 150. The shaft is forced through the transfer slot 124a so that sides 156 of button 154 contact recessed edges 127 of the retainer opening 125, as previously described. The seating of the button in the recess of the retainer opening provides an offset mount and distance between the rubber ply and the module which can be maintained by centrifugal force of the rotating tire.

As noted earlier, the rubber ply can be made with only two layers. Depending on the rubber compounds used to make each ply and the magnitude of the tire deformations, vibrations and shock during normal running of the tire, certain layers of the four layer rubber ply become optional when providing a rubber ply. Generally speaking, the second and fourth layers of the rubber ply, as illustrated in FIGS. 11A and 11B, are optional layers. For example, the rubber ply 230 of FIG. 11C is made with two plies. The first rubber layer 232 is the sticky-mix layer providing a first side 230a for improved attachment of the rubber ply to the inner surface of the tire. There is no second layer and a third rubber layer is a main support layer 237 for the shaft 252 of the fastener device 250. The preferred main support layer is compounded to have the size and strength to resist the environmental forces, such as shock, vibrations and tire surface area deformations associated with supporting the tire monitor without the addition of reinforcing members. However, reinforcing members can be provided when necessary. The optional fourth or cover layer has also been removed. The shaft is made to be integral with main support layer 237 of the rubber ply and has a length to extend into the cavity of the tire.

As can best be seen in FIG. 11C, shaft 252 can be provided with an isolation mount which are bumps 252a extending from the shaft and/or resilient nib protrusions 252b extending from the second side 230b of the rubber ply. These bumps or resilient nib protrusions are standoff elements to assist in holding the module at the offset distance "d1" on the shaft of fastener device 250 for isolating the module from the damaging environmental conditions of the tire. Alternatively, isolation mounts can be second fastener parts or nibs extending from the module to achieve the desired offset distance. Module E is preferably configured to be installed to be in the same relative position in this aspect of the invention illustrated in FIG. 5A. The preferred offset distance has a value of about three (3) millimeters. Shafts 44, 52 and 152 in other aspects of the invention can also be provided with bumps and/or resilient nib protrusions to include a resilient stress absorbing pad.

The monitor assembly or device of this invention can be used either with a tire which has been cured to provide a surface area to receive and carry the rubber ply or with an aftermarket tire where a surface area is prepared after curing the tire to receive and carry the rubber ply. Providing a proper surface area for affixing the rubber ply to the inside surface of the tire is achieved by different means. The desired results are the same; which is to have a surface area which permits a positive attachment between a conventional innerliner portion of the tire and the rubber ply of this invention without affecting the integrity of the innerliner portion. Since the conventional innerliner is generally not a clean or properly textured surface, it is necessary to prepare this innerliner by cleaning, buffing or grinding to provide a properly conditioned surface area by removing contaminates. Various means for preparing a surface area are known in the industry that can achieve a surface area suitable for affixing a rubber ply without affecting the integrity of the innerliner. The area must be adequate in size and texture for achieving a surface area to accommodate the rubber ply for production and aftermarket tires within the scope of this invention.

Figure 12:
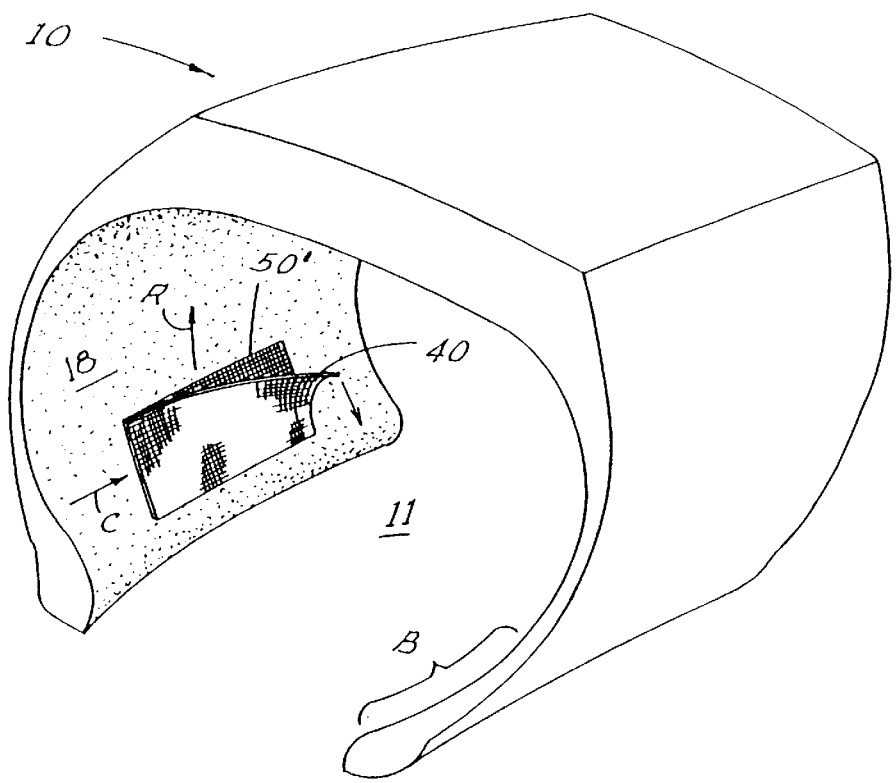
FIG. 12 is a perspective view of a tire showing a fabric sheet being removed from an inside surface of the cured tire to provide a conditioned inner surface area for affixing the rubber ply to the inner surface area of the tire.

As can best be seen in FIG. 12, a means and method for providing a surface area within the tire during curing of the tire for attachment of the tire monitor retainer assembly or monitored vehicle tire and method of this invention is illustrated. A fabric sheet 40 of material cut to the size of the required surface area 50' is placed on the inner surface 18 of the tire 10 in a bead area B on either side of the tire prior to curing. Preferably, the fabric sheet has square woven cords with a raised pattern to provide an embossed area when forced into the inner surface of the tire during curing of the tire. The fabric sheet can be made using any suitable material impermeable to silicon. The fabric sheet is removed after a given post-cure time to provide a conditioned, treated, clean and textured surface area within the tire suitable for affixing the rubber ply to the surface area.

Figure 13:
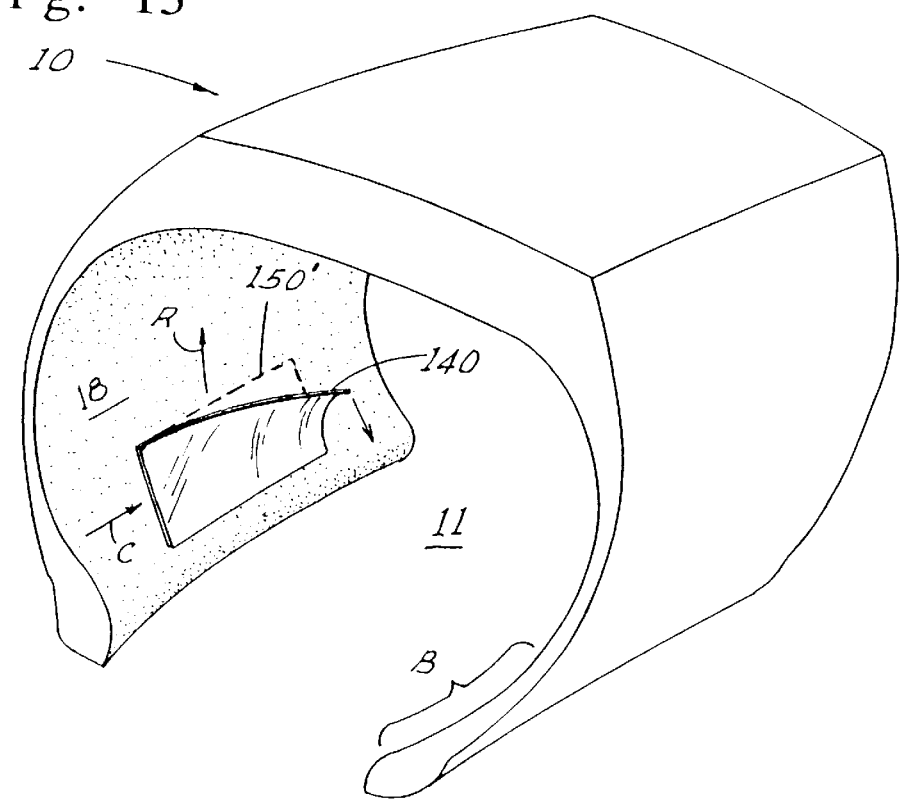
FIG. 13 is a perspective view of a tire showing a plastic sheet being removed from an inside surface of the cured tire to provide a generally smooth and conditioned inner surface area for affixing the rubber ply to the inner surface area of the tire.

In the illustrated aspect of FIG. 13, a plastic or rubber sheet 140 is applied directly to a surface area 150' on the inner surface 18 of the tire 10 in a bead area B on either side of the tire prior to curing the tire. Preferably, the plastic or rubber sheet has a smooth surface which provides a generally smooth area when forced into the inner surface of the tire during curing of the tire. Smooth sheet 140 can be made using any suitable compound impermeable to silicon. The sheet is removed after a given post-cure time to provide a conditioned, treated, clean and smooth surface area within the tire suitable for affixing the rubber ply to surface area 150'.

It is also possible to attach a rubber ply directly to the inside of a tire during curing of the tire as a further variation of the aspects of the tire monitor retainer assembly or monitored vehicle tire. Any of the rubber plies disclosed above and those similar can be positioned within the green tire prior to curing of the tire. Careful control of the rubber ply when it is installed in the green tire in used to maintain the integrity of the tire innerliner during curing of the tire and after the tire is cured.

In another embodiment of a tire monitor retainer assembly of the invention, the retainer assembly G includes first fastener parts in the form of straps 732, 734 made of a semi-rigid material such as a plastic or a molded rubber. Straps 732 and 734 includes a pair of slotted rectangular shaped fasteners 735a and 735b. Each slotted fastener device extends from, and is made to be integral with, a respective semi-rigid strap at a free end of the strap, as illustrated in FIGS. 14–16. The slotted fasteners engage edges of retainer openings 721a and 721b in module E. The retainer openings are shaped to allow the slotted fasteners to snap in place for supporting and holding the module in contact with a folded reinforced rubber ply 330.

Therefore, the slotted fasteners are complementary attachments to the edge elements of the module. The folded reinforced rubber ply is essentially the same as previously described with the embodiment of FIG. 7. The folded reinforced rubber ply is again affixed to the inner surface 18 of the tire at the support interface 19. Slotted fastener devices which have a circular cross-sectional shape to engage circular or elongated retainer openings are also within the scope of this invention. The preferred shape of the slotted fasteners is rectangular to provide stability of the semi-rigid straps when placed adjacent to one another within strap pocket 338.

The first semi-rigid strap 732 and the second semi-rigid strap 734 are made with locking elements 738a and 738b respectively so that the two straps will become locked together when placed in the strap pocket 338 to overlap one another, as illustrated in FIGS. 15 and 16. A front surface portion 737a of first semi-rigid strap 732 has locking elements 738a that project from the surface portion of the first semi-rigid strap. A rear surface portion 737b of the second semi-rigid strap 734 has locking elements 738b that are recessed in the surface portion of the second semi-rigid strap portion. Placing the two semi-rigid straps in the strap pocket from opposite sides of folded reinforced rubber ply 330, as shown by the side arrows, until they overlap one another at a strap interface 731, locks the straps together when forces are applied to pull the straps in a direction opposite the arrows. The number, size and location of the locking elements can vary within the scope of this invention. After placing the straps in strap pocket 338 the module is forced on to the fasteners to contact folded reinforced rubber ply 330 at the same time the retainer openings in the module receive the slotted fasteners. The fasteners snap in place at the edges of retainer openings 721a and 721b to support and hold the module E against the folded reinforced rubber ply 330 of the retainer device A (FIG. 14). The semi-rigid straps including their integral fasteners can be made of any material commonly used for tires, but preferably are of a plastic material such as a nylon or a molded rubber.

Thus, it can be seen that the advantageous construction and method can be had according to the invention for providing a monitored vehicle tire with a retainer assembly for retaining a rigid monitor module within the tire. Alternative locations within the tire can also be selected for locating the surface area within the tire where the module will be positioned. Modules of different shape and size from those illustrated can also be supported by the tire monitor retainer assembly of the invention, and further by using the method of this invention. Alternative features of the rubber ply and the retainer assembly G for securing the module in the tire are disclosed for supporting a variety of modules within the tire and provide, along with the tire, a monitored vehicle tire. The alternative illustrated embodiments of the invention are disclosed to allow for different modules, tire sizes, vehicle uses or environmental conditions as well as economic factors. For example, one application of the monitoring system is to provide a means to read tire pressures when a truck type vehicle drives past a stationary transponder device placed near a roadway. The monitoring system must transmit information from all tires including the remotely located inside dual tires. Therefore, the design and placement of the tire monitor retainer assembly within the tire can be determined to provide a good monitoring system.

The actual makeup of the monitor in the module can be for any intended application in managing the type and amount of desired information. Placing the module inside the tire makes it theft and tamper resistant and keeps it relatively clean. In addition, the means used to access information electronically from or through the components of an electronic module is not critical to the scope of this invention. Any means including hardware and software components appropriate for the intended use and utilization of the module is within the scope of this invention. A further desirable feature in meeting the object of this invention is realized by being able to remove the module from the tire when desired for updating, replacing or repairing the module. The embodiments of this invention allow the module to be removed from the tire. However, removal is not an essential feature of the present invention if the user wishes to keep the module within the tire during the life of the module. Removal may be required if a truck tire is to be recapped from time to time; as the module may be damaged during the retreading process.

While a preferred embodiment of the invention has been described using specific terms, such description is for illustrative purposes only, and it is to be understood that changes and variations may be made without departing from the spirit or scope of the following claims.

What is claimed is:

1. A vehicle tire monitor apparatus for monitoring tire information regarding a vehicle tire comprising:
    a rubber ply having a first side affixed to an interior surface of the tire at a predetermined location within a cavity of the tire;
    a module carried by a second side of said rubber ply for containing electronic components which monitor the tire information;
    a retainer assembly for securing said module to said rubber ply; and
    an isolation mount of said retainer assembly for mounting said module in an offset position with respect to said rubber ply to increase durability of said module and the tire.

2. The apparatus of claim 1 wherein said retainer assembly includes a first fastener part carried by said rubber ply and a complementary, second fastener part carried by said module, said first and second fastener parts cooperating to securely fasten said module to said rubber ply.

3. The apparatus of claim 2 wherein said first fastener part includes at least one shaft having one end affixed to said rubber ply and said shaft having a sufficient length to allow said module to be carried near a remote end of said shaft at an offset distance from said rubber ply to provide said isolation mount.

4. The apparatus of claim 3 wherein said at least one shaft includes a retainer button carried by said remote end of said shaft for limiting the axial movement of said module away from said rubber ply so that said module is generally maintained in said offset distance by said retainer button contacting said second fastener part of said module.

5. The apparatus of claim 4 wherein said second fastener part includes a retainer opening formed in said module for frictionally receiving and retaining said shaft and said retainer button.

6. The apparatus of claim 5 wherein said retainer opening includes a recessed edge for receiving said retainer button so that said module is in an axially displaced position with respect to said rubber ply to define said offset position between said module and rubber ply.

7. The apparatus of claim 6 wherein said retainer opening and retainer button have a non-circular shape so that rotation of said module on said shaft is prevented.

8. The apparatus of claim 5 including an entrance opening formed in said module for initially receiving said shaft along with said retainer button; a transfer slot communicating with said entrance opening and said retainer opening allowing movement of said shaft from said entrance opening to said retainer opening for retention therein.

9. The apparatus of claim 3 wherein said offset distance has a value in a range of about 1 to about 5 millimeters.

10. The apparatus of claim 2 wherein said isolation mount includes index elements carried by one of said first and second fastener parts to mount said module at an offset distance from said rubber ply to define said offset position.

11. The apparatus of claim 2 wherein said isolation mount includes a plurality of standoff elements carried by one of said rubber ply and said module to provide a desired offset position of said module as retained by said first and second fastener parts so that said module is generally maintained at said desired offset position.

12. The apparatus of claim 11 wherein said standoff elements comprise resilient nibs.

13. The apparatus of claim 2 wherein said first fastener part includes two shafts having indexing elements carried by said shafts for engaging said second fastener part of said module to provide said offset position of said module so that said module is generally maintained at an offset distance.

14. The apparatus of claim 2 wherein said first fastener part of said retainer assembly includes a shaft with one end carried by said rubber ply and indexing elements carried near the other remote end of said shaft; and said second fastener part of said retainer assembly including a retainer opening formed in said module for engaging said indexing elements to position said module at an offset distance.

15. The apparatus of claim 14 wherein said retainer opening includes edge elements for engaging with desired ones of said indexing elements to mount said module in said offset position at a desired distance from said rubber ply.

16. The apparatus of claim 1 wherein said isolation mount includes at least one standoff element carried by one of said rubber ply and said module to assist in spacing said module in said offset position being an offset distance from said rubber ply.

17. The apparatus of claim 1 wherein said isolation mount includes a resilient, stress absorbing resilient pad disposed between said module and said rubber ply for isolating said module and positioning said module at an offset distance from said rubber ply.

18. The apparatus of claim 1 wherein said isolation mount includes:
    a pair of spaced apart shafts carried by said rubber ply;
    index elements carried by remote ends of said shafts; and
    retainer openings having edge elements formed in said module, wherein a select pair of said index elements engage respective edge elements to provide said offset position of said module with respect to said rubber ply.

19. The apparatus of claim 2 wherein said first fastener part includes at least one strap carried by said rubber ply for encircling said module and holding said module at said offset position.

20. The assembly of claim 19 wherein said rubber ply is a folded rubber ply forming a plurality of layers with a pocket for receiving said at least one strap, and said at least one strap includes complementary attachments at opposing, free ends for securing said module with said at least one strap.

21. The assembly of claim 20 wherein said second fastener part includes a pair of retainer openings formed in said module in which said strap is placed with said free ends of said strap attached to one another to fasten said module adjacent said rubber ply.

22. The assembly of claim 21 wherein said retainer openings of said module are cutouts at opposed ends of the said module.

23. The assembly of claim 20 wherein said at least one strap includes a pair of semi-rigid straps such that each strap has a first end with locking elements to be placed into said pocket of said rubber ply and a free end having slotted fasteners being external to said rubber ply to provide said first fastener parts to fasten said module adjacent said rubber ply.

24. A method for isolating a module interior to a vehicle tire comprising:

providing a rubber ply having first and second opposed sides;

forming a conditioned surface area on an interior surface of the tire;

affixing said first side of said rubber ply to said conditioned surface area at one of before curing, during curing, and after curing of the tire; and securing a module containing electrical components at a predetermined offset distance from said second side of said rubber ply for increasing durability of the module and the tire, wherein tire information is monitored during the life of the tire.

25. The method of claim 24 wherein the step of securing said module to said rubber ply includes:

providing a first fastener part carried on said rubber ply and a complementary, second fastener part carried by said module; and connecting said first and second fastener parts together, wherein releasing said first fastener part from said second fastener part allows said module to be removed and replaced.

26. The method of claim 24 wherein the step of forming a conditioned surface area includes the step of removing contaminates from said surface area to generally increase the adherence of the rubber ply to said interior surface of the tire.

27. A method for mounting and isolating a monitor within a vehicle tire with a steel reinforced belt and bead core comprising the steps of:

a) providing a resilient, rubber-like mounting shaft on an interior surface of said tire, said mounting shaft projecting from said interior surface, and said shaft being spaced apart from the belt and the bead core;

b) providing indexing elements at the outer end of said shaft;

c) providing a module for monitoring tire information with a retainer opening therein, said retainer opening being adapted to cooperate with said indexing elements to securely hold said module within the tire;

d) mounting said module on said shaft to be retained by said indexing elements; and e) providing an isolation mount to keep the mounted module at an offset position from said interior surface whereby said module maintains a minimum predetermined distance from said interior surface of said tire and is isolated therefrom.

\* \* \* \* \*